United States Patent
Yan (10) Patent No.: US 10,129,367 B2
(45) Date of Patent: Nov. 13, 2018

(54) DELIVERING CONTENT ITEMS USING MACHINE LEARNING BASED PREDICTION OF USER ACTIONS

(71) Applicant: Facebook, Inc., Menlo Park, CA (US)

(72) Inventor: Jinghao Yan, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 243 days.

(21) Appl. No.: 15/273,188

(22) Filed: Sep. 22, 2016

(65) Prior Publication Data

US 2018/0084078 A1 Mar. 22, 2018

(51) Int. Cl.
*H04L 29/08* (2006.01)
*G06N 99/00* (2010.01)
*G06N 7/00* (2006.01)

(52) U.S. Cl.
CPC ........... *H04L 67/327* (2013.01); *G06N 7/005* (2013.01); *G06N 99/005* (2013.01); *H04L 67/02* (2013.01); *H04L 67/22* (2013.01)

(58) Field of Classification Search
USPC ........................................ 709/219, 200, 203
See application file for complete search history.

(56) References Cited

U.S. PATENT DOCUMENTS

| | | | | |
|---|---|---|---|---|
| 2013/0159115 A1* | 6/2013 | Adams | .................. | G06Q 50/01 705/14.66 |
| 2014/0229407 A1* | 8/2014 | White | .................. | G06N 99/005 706/12 |
| 2015/0379430 A1* | 12/2015 | Dirac | .................. | G06N 99/005 706/12 |
| 2017/0102862 A1* | 4/2017 | Marra | .................... | G06Q 50/01 |
| 2018/0012139 A1* | 1/2018 | Schmid | ................ | G06N 99/005 |

* cited by examiner

*Primary Examiner* — El Hadji Sall
(74) *Attorney, Agent, or Firm* — Fenwick & West LLP (57) ABSTRACT

An online system trains a machine learning model for providing content items to users of the online system. The online system logs actions performed by users and generates user feature vectors based on the logged actions. The online system generates item feature vectors based on information about items from third parties. The machine learning model is trained using the user feature vectors and item feature vectors. The machine learning model determines a likelihood that a target user will acquire a certain item, especially after an update or change has occurred relating to that item. The online system selects content items that the target user is likely to be interested in and is likely to interact with.

20 Claims, 6 Drawing Sheets

FIG. 5 ized, an online system provides an ideal forum to increase awareness about items to online system users. The online system further sends content items to users such as news feed stories including photos, videos, and the like.

DELIVERING CONTENT ITEMS USING MACHINE LEARNING BASED PREDICTION OF USER ACTIONS

BACKGROUND

1. Field of Art

This disclosure generally relates to delivery of content items by online systems, and in particular to delivering content items using machine learning based prediction of user actions with the online system.

2. Description of the Related Art

An online system, such as a social networking system, typically has access to large amounts of information describing actions performed by users that may be of interest to other users of the online system. The online system allows its users to connect to and to communicate with other users. Users may create user profiles on the online system that are tied to their identities and include information about the users, such as interests and demographic information. Because of the increasing popularity of these types of online systems and the increasing amount of user-specific information maintained by such online systems, an online system provides an ideal forum to increase awareness about items to online system users. The online system further sends content items to users such as news feed stories including photos, videos, and the like.

Online systems prefer to deliver content items to users that are likely to be of interest to the users. By sending content items that are unlikely to be of interest to users, an online system wastes resources, for example, computing resources and networking resources and provides poor user experience. In some cases, a user may become more interested in the subject of a content item (e.g., a movie described in a news feed story) after certain updates have occurred relating to the subject (e.g., the movie that was previously not playing nearby is now playing at nearby theater), but current online systems do not track such updates and are unable to detect that this content item is now more interesting to the user.

SUMMARY

Users of an online system interact with other users and content items. To provide an engaging user experience for a user, the online system delivers content items specifically selected for the user based on information that is likely to be of interest to the user, traditionally based on the user's profile information. However, users may be more interested in certain content items based on specific actions performed by the users or based on changes or updates associated with the content item that trigger such interest. For instance, the online system may monitor searches performed by a user for certain items to determine that the user is interested in items matching certain search criteria or may monitor actions taken by a user associated with the items (e.g., clicking on a link associated with the item, visiting a page relating to the item, etc.). The online system stores information describing the search criteria specified in the user searches and/or actions taken by the user. The online system monitors changes in status of items, for example, change in a size or color of items available via third party systems. The online system detects if a new item available responsive to a change in status is more likely to be of interest to the user compared to a previous item. The online system delivers a content item describing the new item or the status change in the item to the user. To determine the user's interest in an item or item type, the online system uses a machine learning model trained using feature vectors comprising user feature vectors and item feature vectors. User feature vectors include information about users and item feature vectors include information about items described in content items.

In one embodiment, the online system receives user information about a target user of an online system. The online system receives third party information describing an item. The online system trains a machine learning model using feature vectors identified based on actions performed by users of the online system. The online system receives item information indicating a change in a status of the item. The online system provides inputs to the trained machine learning model. The online system determines, by the trained machine learning model, a likelihood that the target user will acquire the item. The online system sends a content item if the likelihood exceeds a threshold value.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Embodiments of the invention deliver content items to users determined to be interested in performing certain actions, for example, users determined to be interested in acquiring a certain item associated with a third party. In an example situation, a user searches for a new pair of running shoes on websites of various third parties such as AMAZON.COM® or WALMART™. The user finds a pair of running shoes that the user wants to acquire from a third party. However, the third party does not currently have the user's particular size of shoe in stock. It is desirable and challenging to determine a method for conveniently notifying the user when the shoe in the particular size is back in stock. A user may manually sign up for information such as an email message indicating that a certain item is back in stock. However, it is time consuming and impractical for users to manually sign up for email messages for all of the items that a user wants to acquire from various third parties. Embodiments of the invention predict likelihood of a user acquiring an item associated with the third party and deliver appropriate content items associated with the item to the user if a change in status occurs for the item.

Figure 1:
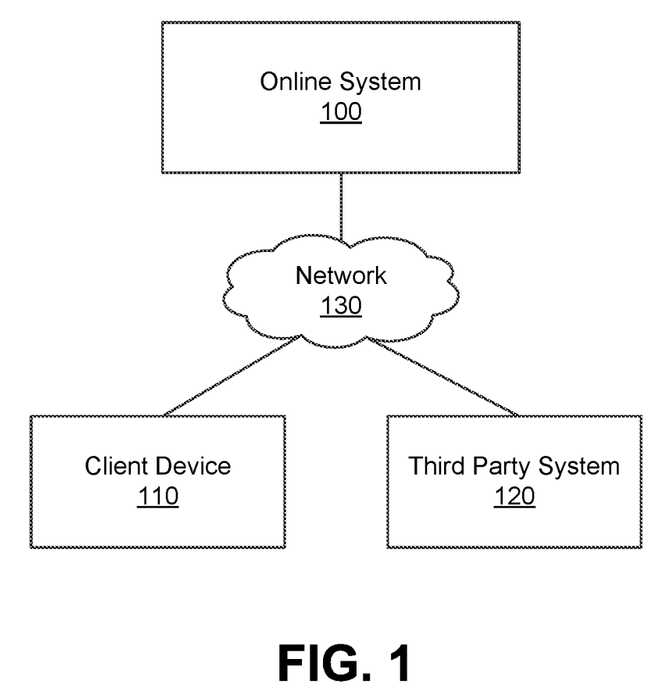
FIG. 1 is a diagram of a system environment for sending content items based on predicting user actions on an online system according to one embodiment.

FIG. 1 is a diagram of a system environment for sending content items based on predicting user actions associated with an online system according to one embodiment. The system architecture includes an online system 100, a client device 110, and a third party system 120 connected to each other via a network 130. In other embodiments, different and/or additional entities can be included in the system architecture. In particular, the system architecture can include multiple client devices 110 or multiple third party systems 120 each in a different domain from the online system 100.

The online system 100 includes a computing environment that allows users of the online system 100 to communicate or otherwise interact with each other and access content. The online system 100 receives information about the users, for example, user profile information and information about actions performed by users on the online system 100 or a third party system 120. The online system 100 also receives information from third party systems 120. Based on the received information, the online system 100 predicts actions of a given user including actions that the user is likely to perform on the third party systems 120. Based on the predicted actions, the online system 100 sends a content item to the client device 110 for display to the given user. For example, the online system 100 predicts that the given user is likely to acquire a pair of shoes based on information indicating that the user has recently visited websites of third party systems 120 promoting shoes. Further, the online system 100 received information indicating that a third party system has a new type of shoe in stock, e.g., the shoe is a new color or design. Thus, the online system 100 sends a content item describing the new type of shoe to the given user. The content item may encourage the given user to take action, e.g., acquire the new type of shoe from the third party system.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 130. In one embodiment, a client device 110 executes an application allowing a user of the client device 110 to interact with the online system 100 or the third party system 120. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

In one embodiment, a third party system 120 is an application provider communicating information describing applications for execution by a client device 110 or communicating data to client devices 110 for use by an application executing on the client device 110. In other embodiments, a third party system 120 provides content or other information for presentation via a client device 110. The third party system 120 can provide a third party website that communicates content to the online system 100. The content may be created by the entity that owns the third party system 120. Such an entity may be a company or other type of organization offering a product (e.g., a tangible object or an intangible service), or message that the company wishes to promote, which is referred to herein as an "item."

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

II. System Architecture of Online System

Figure 2:
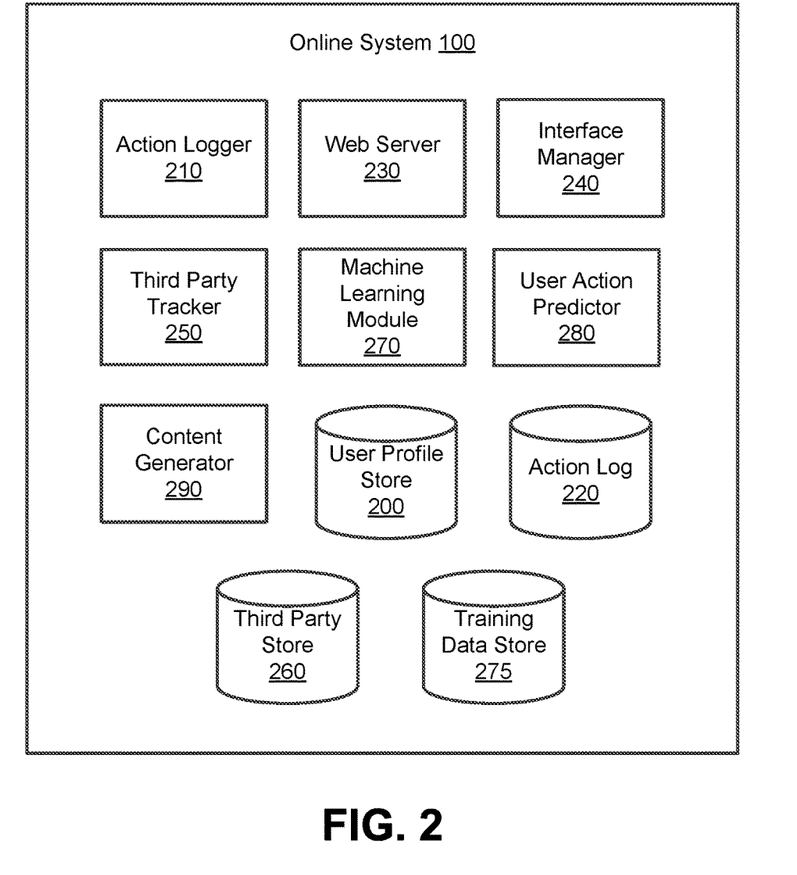
FIG. 2 is a block diagram illustrating the architecture of an online system for predicting user actions according to one embodiment.

FIG. 2 is a block diagram illustrating the architecture of the online system 100 for predicting user actions according to one embodiment. The online system 100 includes a user profile store 200, action logger 210, action log 220, web server 230, user interface manager 240, third party tracker 250, third party store 260, machine learning module 270, training data store 275, user action predictor 280, and content generator 290. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with each user of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 100 displayed in an image. A user profile in the user profile store 200 may also maintain references to actions by the corresponding user performed on the online system 100. The user profile store 200 further stores data describing one or more relationships between different users and allows users to specify their relationships with other users. For example, these user-defined relationships allow users to generate relationships with other users that parallel the user's real-life relationships, such as friends, co-workers, partners, and the like.

The user profile store 200 can store user profiles associated with individuals, as well as user profiles associated with entities such as businesses or organizations, e.g., that own a third party system 120. This allows an entity to establish a presence on the online system 100 for connecting and exchanging content with other users of the online system 100. The entity may post information about itself, about items associated with the entity, for example, products offered by the entity, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track user actions on the online system 100, as well as actions on third party systems 120 that communicate information to the online system 100. Users may interact with various objects on the online system 100, and the action logger 210 stores information describing these interactions in the action log 220. Examples of interactions with objects include: viewing products on a brand page, commenting on posts, sharing links, and checking-in to physical locations via a mobile device, accessing content items, and any other interactions. Additional examples of interactions with objects on the online system 100 that are included in the action log 220 include: acquiring a product from a third party system 120, commenting on a photo album, communicating with a user, establishing a connection with an object, joining an event to a calendar, joining a group, creating an event, authorizing an application, using an application, expressing a preference for an object ("liking" the object) and engaging in a transaction.

Additionally, the action log 220 may record a user's interactions with content (e.g., sponsored or non-sponsored content) on the online system 100 as well as with other applications operating on the online system 100. In some embodiments, data from the action log 220 is used to infer interests or preferences of a user, augmenting the interests included in the user's user profile and allowing a more complete understanding of user preferences. The action log 220 can record information about client devices 110 that a user uses to interact with the online system 100. For example, the action log 220 records whether the user used a laptop computer or smartphone client device to interact with the online system 100. Further, the action log 220 may include information about the types of client devices 110, e.g., smartphone running an IOS® or ANDROID™ operating system.

The action log 220 may also store user actions performed on a third party system 120, such as an external website, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 220 can record information about actions that users perform on a third party system 120 including webpage viewing histories, content that were engaged, acquisitions made, and other patterns from past actions. The action log 220 can also store information about user actions performed on a third party system 120 received from the third party tracker 250, which is further described below.

The web server 230 links the online system 100 via the network 130 to the one or more client devices 110. The web server 230 serves web pages, as well as other web-related content, such as JAVA®, FLASH®, XML and so forth. The web server 230 may receive and route messages between the online system 100 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 200. Additionally, the web server 230 may provide application programming interface (API) functionality to send data directly to native client device operating systems, such as IOS®, ANDROID™, WEBOS® or RIM®.

The user interface manager 240 generates graphical user interfaces presenting information from the online system 100. For example, the graphical user interfaces display content items, e.g., notifications, information about products, news feed stories, brand pages, content, etc., on client devices 110 of users of the online system 100. The content items may be based on information from the user profile store 200 or the action log 220, or based on a user's predicted actions. The user may provide information to the online system 100 via the user interface manager 240, e.g., interactions performed by users with content items on the online system 100. Similarly, the third party system 120 may provide information to the online system 100 via the user interface manager 240, e.g., information about items such as products.

The third party tracker 250 receives third party information from third party systems 120 and stores the received information in the third party store 260. The third party tracker 250 can periodically send a request for third party information to a third party system 120. The third party system 120 provides the third party information in response to receiving the request. Third party systems 120 can also provide third party information proactively to the third party tracker 250 without requiring a request. For example, a third party system 120 automatically provides third party information in response to a change in status of an item (e.g., the item is back in stock or has a change in price). Further, the third party tracker 250 can also determine a change in status of an item based on third party information, e.g., by comparing previously received third party information with updated third party information. As another example, a third party system 120 automatically provides third party information on a regular basis to the third party tracker 250, e.g., once every day, week, or month.

In one embodiment, the third party tracker 250 receives information from a third party system 120 using pixel tracking. The third party tracker 250 provides a pixel to the third party system 120 to be included in a user interface associated with the third party system 120. The third party system 120 provides third party information to the third party tracker 250 in response to a user of the online system 100 viewing the pixel of the user interface. For example, the pixel is included in a user interface displaying a website (or a mobile application) of the third party system 120. The website is promoting an item, for example, a product, and includes information about the item such as the name, description, inventory, availability, price, manufacturer part number (MPN), stock keeping unit (SKU) number, and other types of information of the item. In some embodiments, the website may show a list (e.g., a virtual cart) of items that the user wants to acquire. When the client device 110 of the user displays the pixel of the website on the display screen of the client device, the third party system 120 provides third party information to the third party tracker 250 indicating that the user viewed the website. Additionally, the third party information describes the information about the item. In some embodiments, the third party tracker 250 can provide multiple pixels to the third party system 120. The multiple pixels can each be associated with the same item or with a different item.

The third party store 260 stores historical data about items associated with third party systems 120. For instance, the third party tracker 250 stores a price of an item to the third party store 260. At a later time, the third party tracker 250 stores an updated price of the item to the third party store 260. Thus, the third party store 260 accumulates multiple prices of the item over time. The third party store 260 may also store other types of temporal or trending data such as times of the year when an item has greater or less inventory than average, or when new types of items become available from third party systems 120 (e.g., new items typically become available before the Thanksgiving and Christmas holidays).

The machine learning module 270 uses machine learning techniques to train one or more models, e.g., a machine learning model such as an action predictor model. Machine learning techniques include, for example, linear regression, decision trees, support vector machines, classifiers (e.g., a Naive Bayes classifier), and gradient boosting. The user action predictor 280 uses the trained models to predict actions of users of the online system 100. The user action predictor 280 and the action predictor model are further described herein.

The user action predictor 280 takes, as input, user data about a target user (e.g., user profile information of the target user and actions performed by the target user) and item data associated with a certain item associated with a third party system (e.g., information indicating a change in status of the item). Based on the user data, item data, and trained models, the user action predictor 280 generates a score indicative of a likelihood that the target user will acquire the item, for example, from a third party system 120. In another embodiment, the user action predictor 280 generates a score indicative of a likelihood that the target user will execute a transaction associated with the item. In another embodiment, the user action predictor 280 generates a score indicative of a likelihood that the target user will be interested in information describing the item. In another embodiment, the user action predictor 280 generates a score indicative of a likelihood that the target user will perform an interaction with a content item associated with the item, for example, access the content item, comment on the content item, share the content item, or like the content item.

The machine learning module 270 trains the one or more models using feature vectors identified based on training data from the training data store 275. The machine learning module 270 can periodically re-train the models using feature vectors based on updated training data. Example feature vectors (further described with reference to FIG. 4B) include information about types of items that users frequently acquired or trends describing historical changes in price of an item. In some embodiments, the training data includes predetermined information about a population of users of the online system 100 (or individuals in general) provided to the online system 100. For example, the training data includes information describing certain types of items that are popular among a given population of users. In particular, NIKE® sneakers are popular among female teenage users, relative to other brands of shoes.

The training data store 275 can include (e.g., in addition to the training data and feature vectors previously described) baseline information. The machine learning module 270 can identify feature vectors based on the baseline information. In one embodiment, the baseline information indicates the likelihood that a target user with certain characteristics (e.g., based on information from the user profile store 200 or action log 220) will acquire an item based on information about the target user and the item. For example, the baseline information indicates that a 20-30 year old female user located in Santa Monica, Calif., has a 70% likelihood of purchasing a shoe in the $40-80 price range. As another example, the baseline information indicates that a user who has purchased a calculus textbook has an 80% likelihood of purchasing an exam preparation service. In some embodiments, the training data store 270 retrieves information from a global database of training data accessible to the online system 100 via the network 130.

The online system 100 can include multiple user action predictors 280 each associated with a different geographical region, e.g., a country such as the United States, China, India, or England. Each user action predictor 280 may use a different model trained by the machine learning module 270 using feature vectors specific to the corresponding geographical region. Predicted user actions may differ based on the geographical region. For instance, actions (e.g., frequently purchasing certain types of goods or services) of a typical user in the United States are different than actions of a typical user in China. Thus, categorizing user action predictors 280 by geographic region can provide additional granularity in the predicted user actions. In other embodiments, the online system 100 can categorize user action predictors 280 based on other types of information such as demographic data (e.g., different age ranges, socioeconomic status, or ethnic backgrounds), user connections, or internet-connected device usage (e.g., type of operating system of client devices used by a user). In one example, a first user action predictor 280 is associated with users who make more online purchases using a mobile client device (e.g., a smartphone or tablet), and second user action predictor 280 is associated with users who make more online purchases using a laptop or desktop computer type client device.

The content generator 290 generates content items for presentation to users of the online system 100. The content generator 290 can analyze information stored in the user profile store 200 or action log 220 to identify information useful for generating content items. The content generator 290 also obtains information from other modules, for example, from the user action predictor module 280 or other run time modules that implement functionality for performing different types of actions. For example, if a user views a brand page of a third party system 120, the module executing the code for displaying the brand page to the user informs the content generator 290 of the action so that the content generator 290 can generate a content item describing the action. In another example use case, the content generator 290 receives, from the user action predictor 280, a high likelihood that a user will purchase a new NIKE® shoe that is in stock. Based on the predicted action, the content generator 290 generates content items customized for the user. For example, a content item is a notification informing the user that the new NIKE® shoe is available. Further, the content generator 290 can generate content items based on information provided by a third party system 120, e.g., NIKE® provides information about items such as images and prices of shoes.

III. Change in Status of Items

Figure 3A:
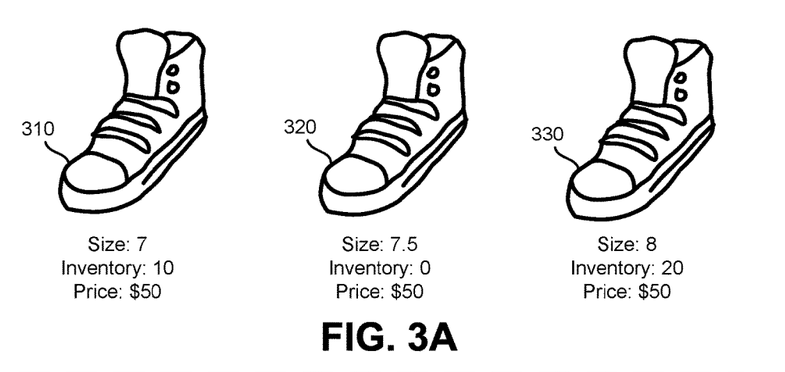
FIG. 3A is a diagram of three types of shoes from a third party system according to one embodiment.
Figure 3B:
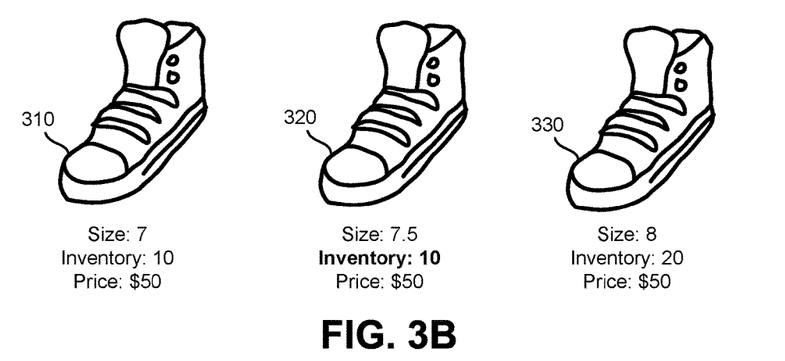
FIG. 3B is a diagram of the three types of shoes shown in FIG. 3A with a change in status of inventory according to one embodiment.

FIG. 3A is a diagram of three types of shoes from a third party system 120 according to one embodiment. The third party system 120 receives third party information about the three types of shoes. In particular, the first shoe 310 has a size of 7, an inventory of ten, and a price of $50. The second shoe 320 has a size of 7.5, an inventory of zero, and a price of $50. The third shoe 330 has a size of 8, an inventory of twenty, and a price of $50. As previously described, the third party tracker 250 can determine changes in status of items provided by a third party system 120. FIGS. 3A-B show different types of changes in status of the three shoes, i.e., items provided by a third party system 120.

FIG. 3B is a diagram of the three types of shoes shown in FIG. 3A with a change in status of inventory according to one embodiment. The third party system 120 receives updated third party information about the three types of shoes. In particular, the second shoe 320 has an updated inventory of ten. Since the inventory of the second shoe 320 was previously zero (as shown in FIG. 3A), the third party system 120 determines that the there is a change in status of inventory of the second shoe 320. The third party system 120 provides the change of status of inventory to the user action predictor 280. The user action predictor 280 also retrieves information about a target user, e.g., indicating that the target user previously purchased shoes with a size of 7.5. The user action predictor 280 determines a high likelihood (e.g., 90%) that the target user will purchase the second shoe 320, e.g., because the size of the second shoe 320 matches the size of shoes that the target user previously purchased. In response to the likelihood being above a threshold value (e.g., 50%), the content generator 290 generates a notification based on the change of status of the second shoe 320, e.g., the second shoe 320 is back in stock. The online system 100 displays the notification to the target user, which may encourage the target user to purchase the second shoe 320.

Figure 3C:
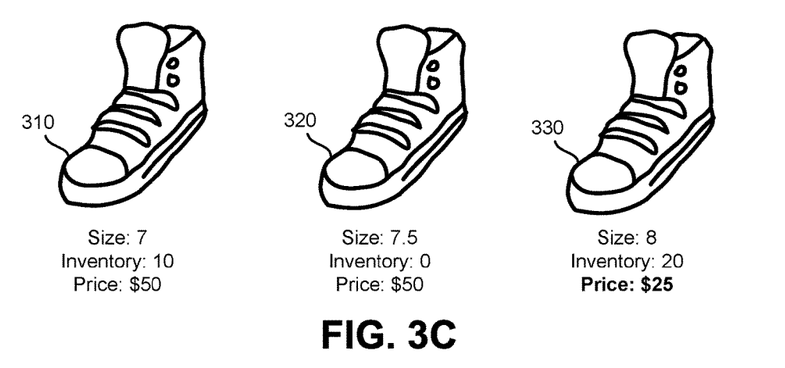
FIG. 3C is a diagram of the three types of shoes shown in FIG. 3A with a change in status of price according to one embodiment.

FIG. 3C is a diagram of the three types of shoes shown in FIG. 3A with a change in status of price according to one embodiment. The third party system 120 receives updated third party information about the three types of shoes. In particular, the third shoe 330 has an updated price of $25. Since the price of the third shoe 330 was previously $50 (as shown in FIG. 3A), the third party system 120 determines that the there is a change in status of price of the third shoe 330. The third party system 120 provides the change of status of price to the user action predictor 280. The user action predictor 280 also retrieves information about a target user, e.g., indicating that the target user previously purchased shoes with prices less than $30. The user action predictor 280 determines a high likelihood (e.g., 80%) that the target user will purchase the third shoe 330, e.g., because the previous price of the third shoe 330 is greater than $30, and the updated price of the third shoe 330 is less than $30. In response to the likelihood being above a threshold value (e.g., 60%), the content generator 290 generates a notification based on the change of status of the third shoe 330, e.g., the third shoe 330 has a decreased price. The online system 100 displays the notification to the target user, which may encourage the target user to purchase the third shoe 330.

IV. User Action Predictor

Figure 4A:
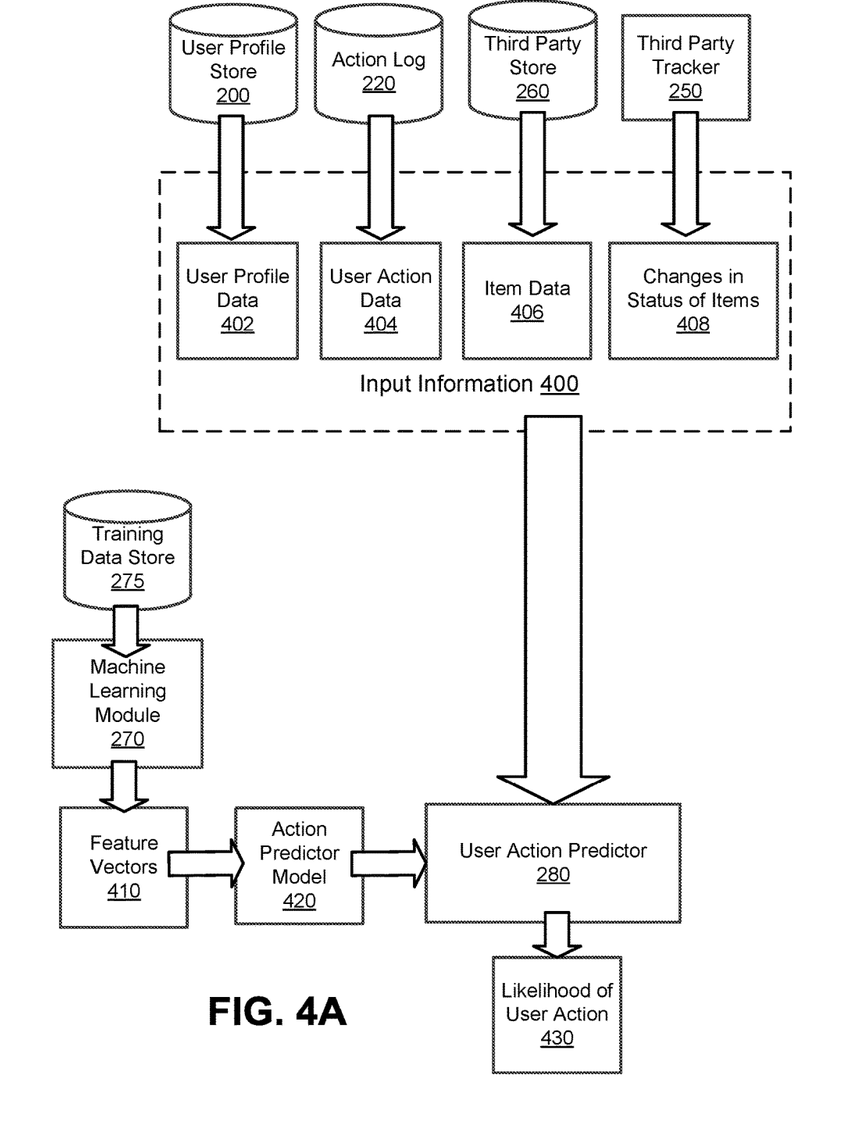
FIG. 4A is a data flow diagram of a process for training an action predictor model used for predicting user actions according to one embodiment.

FIG. 4A is a data flow diagram of a process for training an action predictor model 420 used for predicting user actions according to one embodiment. The machine learning module 270 retrieves training data from the training data store 275 and extracts features vectors 410 from the training data. The machine learning module 270 trains the action predictor model 420 using the feature vectors 410. The user action predictor 280 uses the trained action predictor model 420 and input information 400 to generate a likelihood of user action 430, e.g., a likelihood that a user will acquire an item. The likelihood can be represented as a percentage value (e.g., from 0%, indicating that the user will not acquire the item, to 100%, indicating that the user will acquire the item) or any other representation of a score value.

The input information 400 can include user profile data 402 from the user profile store 200 (e.g., demographic data, hometown data, or friends and family data of the user), user action data 404 from the action log 220 (e.g., checking-in to a geographical location or event, acquiring items from third party systems 120, or visiting a brand page of a third party system 120), item data 406 from the third party store 260 (e.g., price, inventory, or type of an item), and one or more changes in status of one or more items 408 from the third party tracker 250 (e.g., a change in price, inventory, or type of an item).

Figure 4B:
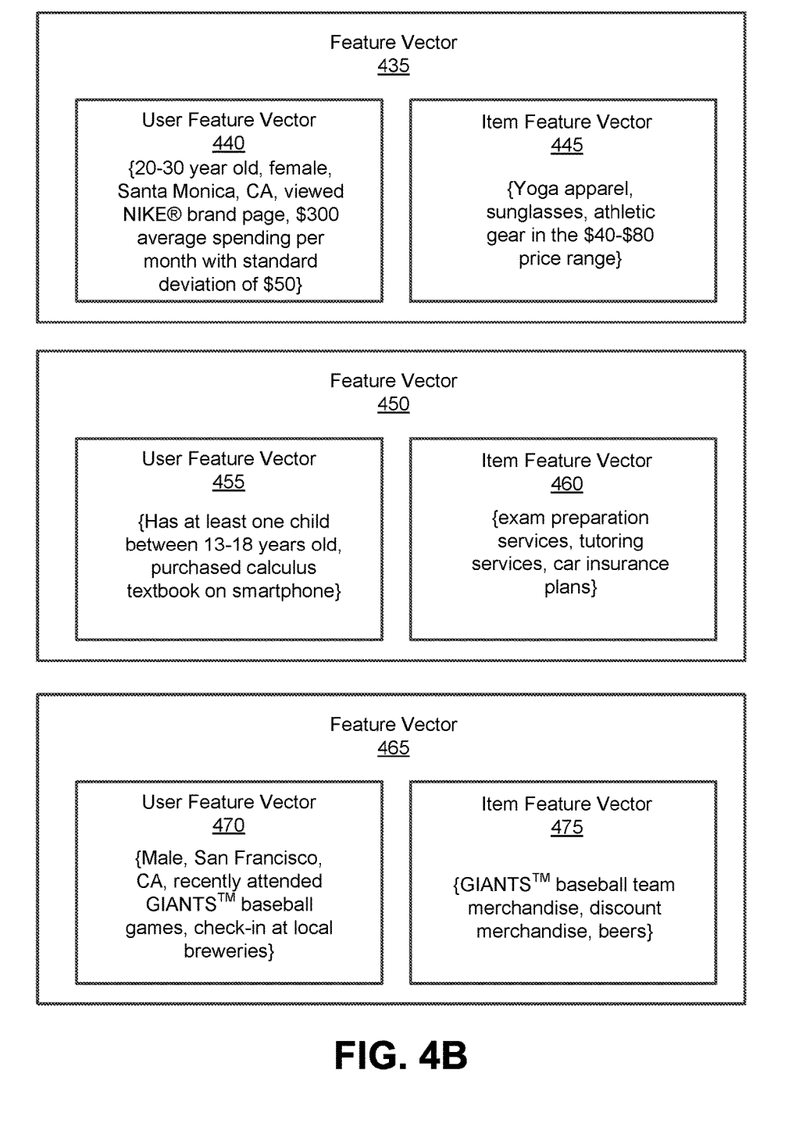
FIG. 4B is a diagram of feature vectors used to train the action predictor model shown in FIG. 4A according to one embodiment.

FIG. 4B is a diagram of feature vectors used to train the action predictor model 420 shown in FIG. 4A according to one embodiment. Feature vector 435 includes user feature vector 440 and item feature vector 445. The user feature vector 440 indicates that a group of users include users of the online system 100 who are 20-30 year old females who live in Santa Monica, Calif., viewed a NIKE® brand page, and spend an average of $300 per month (e.g., on clothing) with a standard deviation of $50. The item feature vector 445 indicates that users from the group of users frequently purchase yoga apparel, sunglasses, athletic gear in the $40-80 price range. In other embodiments, item feature vectors can include other types of information about items such as a color, price, and type of an item. Thus, the action predictor model 420 trained with the feature vector 435 learns that users who have characteristics in common with the group of users have a strong affinity (i.e., likelihood) for purchasing items that are have at least one of the item feature vector 445.

For example, the user action predictor 280 takes input information describing a target user who is a 25 year old female living in Los Angeles, Calif. and spends an average of $280 per month on clothing. The target user is within the 20-30 year old age range of the group of users, has the same gender as the group of users, lives in a city nearby the group of users, and has an average monthly spending within one standard deviation of that of the group of users. Additionally, the user action predictor 280 takes input information describing an item, in particular, a pair of yoga pants. The input information also describes a change in status of price of the yoga pants, e.g., the price of the yoga pants has decreased from $100 to $50. The item is a type of yoga apparel and within the $40-80 price range due to the change in status of price. Thus, the user action predictor 280, using the trained action predictor model 420, generates a high likelihood that the target user will purchase the yoga pants. Further, the content generator 290 can generate a content item including an image of the yoga pants and text describing the price of the yoga pants for display to the target user.

Feature vector 450 includes user feature vector 455 and item feature vector 460. The user feature vector 455 indicate that a group of users include users of the online system 100 who have at least one child between 13-18 years old and purchased a calculus textbook on a smartphone (e.g., a mobile client device 100). The item feature vector 460 indicate that users from the group of users frequently purchase exam preparation services, math tutoring services, and car insurance plans. Thus, the action predictor model 420 trained with the feature vector 450 learns that users who have characteristics in common with the group of users have a strong affinity for purchasing items that are have at least one of the item feature vector 460.

For example, the user action predictor 280 takes input information describing a target user who has a 17 year old child and recently made an online purchase using a smartphone. The target user has a child within the age range of 13-18 years old and also made a purchase on a smartphone, similar to the group of users. Additionally, the user action predictor 280 takes input information describing an item, in particular, a SAT test tutoring service located at a tutoring center nearby the target user. The input information also describes a change in status of types of tutoring services provided by the tutoring center, e.g., the tutoring center previously only provided tutoring services for math and science subject classes, and now provides tutoring services for SAT test preparation as well. The item is a type of exam preparation service and also a type of tutoring service. Thus, the user action predictor 280, using the trained action predictor model 420, generates a high likelihood that the target user will purchase the SAT test tutoring service from the tutoring center. Further, the content generator 290 can generate a content item including a video of SAT test tutors at the tutoring center for display to the target user.

Feature vector 465 includes user feature vector 470 and item feature vector 475. The user feature vector 470 indicates that a group of users include users of the online system 100 who have are male, living in San Francisco, Calif., recently attended GIANTS™ baseball games, and have checked-in at local breweries. The item feature vector 475 indicates that users from the group of users frequently purchase GIANTS™ baseball team merchandise, discount merchandise, and beers. Thus, the action predictor model 420 trained with the feature vector 465 learns that users who have characteristics in common with the group of users have a strong affinity for purchasing items that are have at least one of the item feature vector 475.

For example, the user action predictor 280 takes input information describing a target user who lives in Palo Alto, recently attended a GIANTS™ baseball game, and checked-in at a brewery in San Francisco. The target user lives nearby San Francisco, Calif., recently attended a GIANTS™ baseball game, and checked-in at a local brewery, similar to the group of users. Additionally, the user action predictor 280 takes input information describing an item, in particular, a GIANTS™ team branded pilsner glass. The input information also describes a change in inventory of the pilsner glass (e.g., the pilsner glass is a new item in stock at a GIANTS™ team merchandise store) and a change in price of the pilsner glass (e.g., the price decreased by 10% from the manufacturer's suggested retail price). The item is a type of GIANTS™ baseball team merchandise, is discounted merchandise, and can be used to drink beer. Thus, the user action predictor 280, using the trained action predictor model 420, generates a high likelihood that the target user will purchase the pilsner glass. Further, the content generator 290 can generate a content item including a uniform resource locator (URL) to a third party GIANTS™ baseball team merchandise webpage showing the item (e.g., where the target user can make an online purchase of the pilsner glass) for display to the target user.

The action predictor model 420 weighs certain feature vectors more heavily than other feature vectors. In an embodiment, the action predictor model 420 associates feature vectors describing actions performed by users connected to a target user on the online system 100 (e.g., friends and family members) with a greater weight than feature vectors describing actions performed by other users not connected to the target user. Weighing actions performed by connections of a target user more heavily results in more accurate predictions of actions of the target user. For example, the target user is more likely to purchase similar items as the items purchased by the user's friends. In an embodiment, the action predictor model 420 weighs feature vectors associated with connections of the user based on a measure of affinity between the user and the connections. Accordingly, the action predictor model 420 weighs actions associated with connections having high affinity with the user more heavily compared to actions associated with connections having low affinity with the user. In other embodiments, the action predictor model 420 weighs feature vectors associated with users not connected with a target user more heavily. Rather, the action predictor model 420 can weigh feature vectors based on other types of user information such as commonalties in user interests, geographical location, or demographic data.

Though only three example feature vector are shown in FIG. 4B, in practice, the machine learning module 270 trains the action predictor model 420 using many more feature vector, for example, including hundreds of different user feature vectors and thousands of different item feature vectors.

V. Example Process Flow

Figure 5:
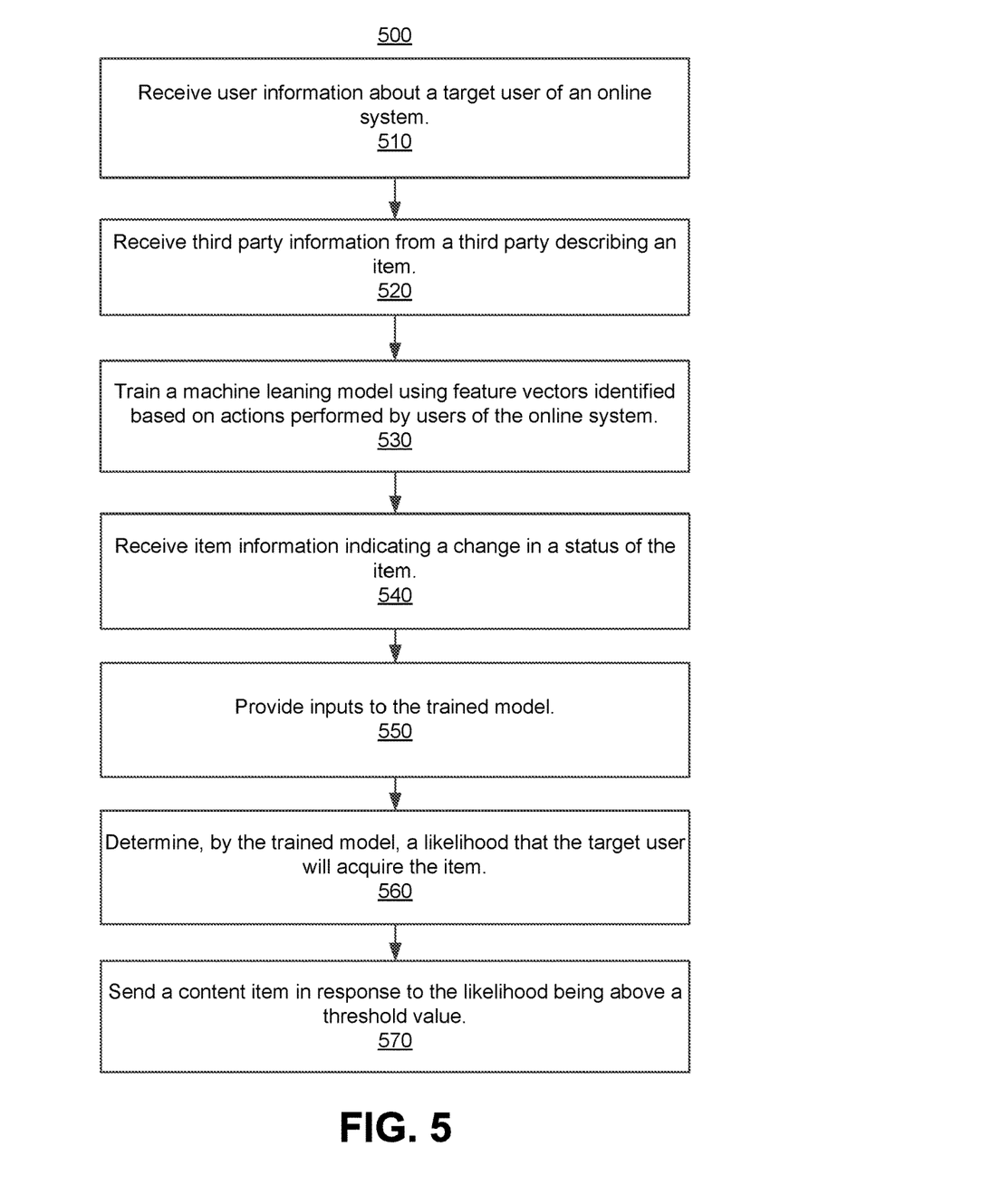
FIG. 5 is a flowchart illustrating a process for sending content items based on predicting user actions on an online system according to one embodiment.

FIG. 5 is a flowchart illustrating a process 500 for sending content items based on predicting user actions on an online system according to one embodiment. In some embodiments, the process 500 is used by the online system 100—e.g., modules of the online system 100 described with reference to FIG. 2—within the system environment in FIG. 1. The process 500 may include different or additional steps than those described in conjunction with FIG. 5 in some embodiments or perform steps in different orders than the order described in conjunction with FIG. 5.

The online system 100 receives 510 user information about a target user of the online system 100. The user information can describe user profile information of the user and interactions performed by the user on the online system 100. The third party tracker 250 receives 520 third party information from a third party (e.g., associated with a third party system 120) describing an item such as a product or services provided by the third party. In some embodiments, the target user is interested in acquiring the item. The machine learning module 270 trains 530 a machine learning model (e.g., the action predictor model 420 shown in FIG. 4A) using feature vectors identified (by the machine learning module 270) based on actions performed by users of the online system 100. For example, the actions describe items that the users previously acquired from third party systems 120. The feature vectors can also be based on information about the users, e.g., demographic data or geographical location of the users. The machine learning model is configured to determine a likelihood that a particular user of the online system 100 will acquire a particular item, e.g., associated with third party systems.

The third party tracker 250 receives 540 item information indicating a change in a status of the item. The user action predictor 280 provides 550 inputs to the trained model. The inputs may include the user information, the third party information, and/or the item information. The user action predictor 280 determines 560, by the trained model based on the inputs, a likelihood that the target user will acquire the item. The user action predictor 280 can also use the user information, the third party information, and the item information to determine the likelihood. The online system 100 sends 570 a content item (e.g., a notification, content, other any other type of content item) in response to the likelihood being above (i.e., exceeding) a threshold value. In an embodiment, the content generator 290 generates the content item. The content item can indicate the change in the status of the item. In other embodiments, the online system selects a content item associated with the item that was previously generated. In some embodiments, the online system 100 sends the content item for display on a client device 110 of the target user. Thus, the target user can view the content item and take action in response to viewing the content item, e.g., acquiring the item from the third party.

VI. User Searches

In one embodiment, the machine learning module 270 generates user feature vectors based on past user interactions performed by a user of the online system 100, for example, searches for specific item types. The online system 100 determines whether the search results returned item types that matched the search criteria specified by the user. The online system 100 compares the results returned by the search with the search criteria to verify whether the user found items matching the search criteria. In an embodiment, the third party tracker 250 compares one or more items returned as search results with the search criteria to see if any search result satisfies all the search criteria, for example, a size specified for the item, a price range specified for the item, a quantity specified for the item, a color specified for the item, or any item specific attribute specified for the item. The third party tracker 250 further checks if the user performed a transaction for an item returned in the search results. The third party tracker 250 monitors for user requests indicative of purchases by the user to verify if the user acquires an item returned by the search or an item that matches the search criteria specified by the user in the searches performed before the transaction was performed. Accordingly, the online system 100 determines that the user indicated an interest in a specific item type but failed to acquire an item of that specific type.

In an embodiment, the third party tracker 250 stores information identifying the user and the criteria specifying an item type that the user indicated an interest in. In an embodiment, the online system 100 determines a score indicating a match between the search results and the search criteria specified by the user. In an embodiment, the online system 100 determines a score for an item type indicative of how close the item type is to a previous search performed by the user. The online system 100 may determine the scores using a machine learning model trained by the machine learning module 270 using various search criteria and various item types.

In an embodiment, the machine learning model uses previous user interactions, e.g., past transactions by the user to determine the score. For example, the online system 100 may use past acquisitions of items by the user to determine parameters of item types that are not specified by the user in the search request. For example, if the user does not indicate the price range of an item type in the search criteria, the online system 100 (e.g., via the machine learning model) determines a target price range based on past purchases of the user and uses the target price range along with the search criteria to score an item type. Accordingly, an item type that is closer to a price range determined based on past user purchases has higher score compared to an item type that is further from the price range (assuming the price range is not specified in the search criteria). Similarly, the online system 100 may determine the target size of a clothing item based on sizes of matching clothing items previously acquired by the user if the search criteria provided by the user do not specify the size of the clothing item.

In one embodiment, responsive to the user performing one or more searches for an item or item type, the online system 100 stores a data structure representing a trigger comprising the search criteria provided by the user, information identifying the user, the highest score of the items returned in the search results, and/or the item having the highest score. The third party tracker 250 monitors status changes of item types in an inventory of third party systems 120 and evaluates matching triggers to determine whether to send a content item describing the status change or the new item type to the user. In an embodiment, the third party tracker 250 identifies any attributes that fail to match between the closest search result and the search criteria. For example, if the user provides search criteria specifying shirts of a particular size, color, and brand name, and the closest search result matches the color and the brand name but fails to match the size, the third party tracker 250 stores the name of any attributes that fail to match (e.g., size in this example).

The third party tracker 250 may periodically check if an item is available, for example, from a third party system 120 that is a better match compared to the recorded searches by the user. In an embodiment, the third party tracker 250 periodically invokes an API of a third party system 120 to perform a search on behalf of the user and analyzes the search results to determine if an item returned in the search results by the third party system 120 is a better match compared to the previously stored items, for example, because the item has a higher score indicating a match between the item and the search criteria, or by verifying that the items returned by a recent search match the search criteria with respect to the attribute that failed to match during previous searches.

In another embodiment, the third party tracker 250 invokes an API of the third party system 120 that allows the online system 100 to specify a trigger comprising the search criteria. Accordingly, based on the trigger specification, the third party system 120 sends information to the online system 100 specifying an item whenever an item satisfying the specific search criteria is available with the third party system 120.

In one embodiment, the third party tracker 250 receives information from a website of a third party system 120. The website includes information about items that users may acquire from the third party system 120. For example, the web site includes a catalog of different items organized based on types of the items, e.g., shoes or books. The website may also include inventory and price information about the items. The third party tracker 250 may periodically receive an updated version of the website so that the online system 100 has the latest information from the third party system 120.

In one embodiment, the third party tracker 250 detects a status change for a particular item type, in which the status change is indicative of instances of the particular item type being available that represent better matches for the user searches compared to those returned in previous searches. The online system 100 sends a content item associated with the particular item type to a client device 110 of the user. For example, if the third party tracker 250 detects a status change associated with an item type, the online system 100 calculates the score of the item type in association with a stored search that was previously performed by the user. If the status change results in a score that indicates a better match compared to the previous results returned to the user, the online system 100 sends content items associated with the item type to the user. The content items may simply describe the item type as a reminder to the user to acquire an item of the item type.

In another embodiment, the online system 100 compares the new status of the item type with the status of the item type that was previously returned to the user in response to the past search and describes the change in the status in the content item. For example, if the size of a clothing item has changed since the search performed by the user such that the new size results in better score for the item compared to the previous size, the content item indicates that the item is available in the new size.

As another example use case, the third party tracker 250 receives information indicating that the user searches on a third party system 120 (or on the online system 100) for shoes having a size of seven and a target price range. The third party system 120 provides search results indicating that shoes having sizes of eight, nine, and ten are available, but not a size of seven. Further, the available shoes have a price range greater than the target price range. The machine learning module 270 generates a user feature vector including information about the user's search and information indicating that the user did not acquire any of the shoes via the third party system 120. The machine learning module 270 generates an item feature vector including information about shoes available via the third party system 120. The machine learning module 270 trains a machine learning model using the user feature vector, the item feature vector, and a training label. The training label indicates information that the machine learning model is trained to predict. For example, the training label indicates whether a user (described by the user feature vector) purchased an item (described by the item feature vector). The trained machine learning model determines that the user likely did not acquire any shoes from the third party system 120 because the third party system 120 did not have a shoe that matched the user's shoe size and/or because the price range of the available shoes is greater than the target price range.

Following in the same example use case, the third party tracker 250 receives information indicating that there is a change in status of the shoes available via the third party system 120. In particular, the shoe is now available in size seven and has a price range that overlaps (or is less than) the target price range. Thus, the trained machine learning model determines that the user will likely be interested in acquiring the shoe because the updated information about the shoe—due to the change in status—matches information from the user's past search on the third party system 120.

VII. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product comprising a non-transitory computer readable storage medium having instructions encoded thereon that, when executed by a processor, cause the processor to:

receive user information about a target user of an online system, the user information describing interactions performed by the target user on the online system;

receive third party information from a third party outside of the online system, the third party information describing an item associated with the third party that the target user is interested in acquiring;

train a machine learning model using feature vectors identified based on actions performed by a plurality of users of the online system and based on the information about the plurality of users, the actions describing items that at least one of the plurality of users previously acquired, the trained machine learning model configured to determine a likelihood that a particular user will acquire a particular item;

receive item information indicating a change in a status of the item associated with the third party;

provide as inputs to the machine learning model, the user information, the third party information, and the item information;

determine, by the trained machine learning model based on the inputs, a likelihood that the target user will acquire the item based on the change in status of the item;

send a content item associated with the item for display on a client device of the target user in response to the likelihood that the target user will acquire the item exceeding a threshold value.

2. The non-transitory computer readable storage medium of claim 1, wherein the content item indicates that a number of instances of the item available via the third party has increased.

3. The non-transitory computer readable storage medium of claim 1, wherein the content item describes an amount of compensation that the target user must provide to the third party to acquire the item.

4. The non-transitory computer readable storage medium of claim 3, wherein the amount of compensation is a first amount of compensation and the item is a first item, wherein the first amount of compensation is less than or equal to a second amount of compensation that the third party specified for a second item, and wherein the second item matches the first item based on one or more characteristics.

5. The non-transitory computer readable storage medium of claim 1, wherein the item is a physical object, and wherein the third party information describes a physical size of the physical object.

6. The non-transitory computer readable storage medium of claim 1, wherein the user information further describes interactions performed by other users of the online system connected to the target user, at least one of the interactions describing another item previously acquired by one of the other users, the another item matching the item based on one or more characteristics.

7. The non-transitory computer readable storage medium of claim 1, wherein the feature vectors are each associated with a weight, a first vector of the feature vectors identified based on actions performed by users connected to the target user on the online system, a second vector of the feature vectors identified based on actions performed by users not connected to the target user on the online system, the first vector weighted higher than the second vector.

8. The non-transitory computer readable storage medium of claim 1, wherein the content item includes one or more of: an image of the item, a video of the item, a description of the item, or a URL to a web page associated with the item.

9. A method comprising:
receiving user information about a target user of an online system, the user information describing interactions performed by the target user on the online system;

receiving third party information from a third party outside of the online system, the third party information describing an item associated with the third party that the target user is interested in acquiring from the third party;

retrieving a plurality of trained machine learning models each associated with a population of users of the online system, each trained machine learning model configured to determine a likelihood that a user matching the corresponding population of users will perform a transaction associated with a particular item;

receiving item information indicating a change in a status of the item;

selecting a trained machine learning model of the plurality of trained machine learning models based at least in part on the user information;

determining, using the selected trained machine learning model, the user information, the third party information, and the item information, a likelihood that the target user will perform a transaction associated with the item;

sending, in response to the likelihood that the target user will perform the transaction associated with the item exceeding a threshold value, a content item associated with the item for display on a client device of the target user.

10. The method of claim 9, wherein the population of users is categorized based on demographic data or geographical location data of the population of users.

11. The method of claim 9, wherein a first trained machine learning model of the plurality of trained machine learning models is associated with a first population of users who acquire items using mobile phones or tablets, and wherein a second trained machine learning model of the plurality of trained machine learning models is associated with a second population of users who acquire items using computers or laptops.

12. The method of claim 9, wherein the item is a tangible object, an intangible service, or message promoted by the third party.

13. A method comprising:
receiving user information about a target user of an online system, the user information describing interactions performed by the target user on the online system;

receiving third party information from a third party outside of the online system, the third party information describing an item associated with the third party that the target user is interested in acquiring;

training a machine learning model using feature vectors identified based on actions performed by a plurality of users of the online system and based on the information about the plurality of users, the actions describing items that at least one of the plurality of users previously acquired, the trained machine learning model configured to determine a likelihood that a particular user will acquire a particular item;

receiving item information indicating a change in a status of the item associated with the third party;

providing as inputs to the trained machine learning model, the user information, the third party information, and the item information;

determining, by the trained machine learning model based on the inputs, a likelihood that the target user will acquire the item based on the change in status of the item;

sending a content item associated with the item for display on a client device of the target user in response to the likelihood that the target user will acquire the item exceeding a threshold value.

14. The method of claim 13, wherein the content item indicates that a number of instances of the item available via the third party has increased.

15. The method of claim 13, wherein the content item describes an amount of compensation that the target user must provide to the third party to acquire the item.

16. The method of claim 15, wherein the amount of compensation is a first amount of compensation and the item is a first item, wherein the first amount of compensation is less than or equal to a second amount of compensation that the third party specified for a second item, and wherein the second item matches the first item based on one or more characteristics.

17. The method of claim 13, wherein the item is a physical object, and wherein the third party information describes a physical size of the physical object.

18. The method of claim 13, wherein the user information further describes interactions performed by other users of the online system connected to the target user, at least one of the interactions describing another item previously acquired by one of the other users, the another item matching the item based on one or more characteristics.

19. The method of claim 13, wherein the feature vectors are each associated with a weight, a first vector of the feature vectors identified based on actions performed by users connected to the target user on the online system, a second vector of the feature vectors identified based on actions performed by users not connected to the target user on the online system, the first vector weighted higher than the second vector.

20. The method of claim 13, wherein the content item includes one or more of: an image of the item, a video of the item, a description of the item, or a URL to a web page associated with the item.

* * * * *